United States Patent
Kang

(10) Patent No.: US 7,519,224 B2
(45) Date of Patent: Apr. 14, 2009

(54) METHOD AND APPARATUS FOR COMPENSATING DATA IMAGE REPRODUCED FROM HOLOGRAPHIC SYSTEM

(75) Inventor: Byung-Bok Kang, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 808 days.

(21) Appl. No.: 11/099,440

(22) Filed: Apr. 6, 2005

(65) Prior Publication Data

US 2005/0226528 A1 Oct. 13, 2005

(30) Foreign Application Priority Data

Apr. 12, 2004 (KR) ................. 10-2004-0025067

(51) Int. Cl.
*G06K 9/76* (2006.01)
*G11B 7/00* (2006.01)

(52) U.S. Cl. ...................... 382/210; 369/103
(58) Field of Classification Search ........ 382/168–179, 382/210, 275; 250/208.1; 359/1, 3, 7, 22, 359/32; 369/103
See application file for complete search history.

(56) References Cited

U.S. PATENT DOCUMENTS

| | | | | |
|---|---|---|---|---|
| 5,511,058 A | * | 4/1996 | Visel et al. ................. | 369/103 |
| 5,694,488 A | * | 12/1997 | Hartmann .................. | 382/210 |
| 5,940,537 A | * | 8/1999 | Regen et al. ............... | 382/210 |
| 6,226,415 B1 | * | 5/2001 | Wilson et al. .............. | 382/275 |
| 6,414,296 B1 | * | 7/2002 | Edwards .................. | 250/208.1 |
| 6,618,185 B2 | * | 9/2003 | Sandstrom ................. | 359/292 |
| 6,697,316 B2 | * | 2/2004 | Burr .......................... | 369/103 |
| 6,894,816 B2 | * | 5/2005 | Kang ......................... | 359/35 |
| 6,999,214 B2 | * | 2/2006 | Kang ......................... | 359/32 |
| 7,289,255 B2 | * | 10/2007 | Baba et al. ................. | 359/35 |
| 2002/0172131 A1 | * | 11/2002 | Burr .......................... | 369/103 |

* cited by examiner

*Primary Examiner*—Jingge Wu
*Assistant Examiner*—Andrae S Allison
(74) *Attorney, Agent, or Firm*—Bacon & Thomas, PLLC

(57) ABSTRACT

The present invention provides a method and apparatus for preprocessing a page image reproduced from a storage medium in a holographic system. The present invention calculates pixel sums for each lines in the page image to select a maximum sum, calculates a modified maximum sum using the modified maximum sum and its neighboring sums, determines a compensation location for distorted pixels using the modified maximum sum and performs over-sampling a data image with reference to the compensation location of magnified pixels, to thereby compensate the data image with high precision in sub-pixels.

10 Claims, 8 Drawing Sheets

METHOD AND APPARATUS FOR COMPENSATING DATA IMAGE REPRODUCED FROM HOLOGRAPHIC SYSTEM

FIELD OF THE INVENTION

The present invention relates to holographic systems; and more particularly, to a method and apparatus of compensating distortions in a holographic data image reproduced from a storage medium in a holographic system.

BACKGROUND OF THE INVENTION

Recently, with the remarkable development of a semiconductor laser, a Charge Coupled Device (CCD) and a Liquid Crystal Display (LCD), research on a holographic digital data storage has been actively conducted everywhere. In a holographic system, interference patterns generated when signal light derived from an object and reference light interfere with each other are recorded in a hologram storage medium. For example, such a storage medium includes photorefractive crystal sensitively reacting to the amplitude of the interference patterns. By varying an incident angle of the reference light on the hologram storage medium, the holographic system is capable of recording the amplitude and phase of signal light, thus displaying a three-dimensional image of an object, and storing several hundred to several thousand of holograms on a single storage medium.

In a recording mode of the holographic system, laser light generated from a light source is divided into reference light and object light. The reference light is reflected at a preset deflection angle and then generated in the form of reference light for recording to be incident on the hologram storage medium. The object light is modulated into signal light representing page image of binary input data to be recorded on the hologram storage medium. The modulated signal light and the reference light interfere with each other to generate an interference pattern. An image of the interference pattern is then recorded on the storage medium as hologram data corresponding to the binary input data. The hologram data to be recorded has a size of N×N pixels (for example, a size of 240×240 pixels) and is subject to a series of pre-processing processes (for example, an insertion of an error correction code (e.g., parity code) therein and a border generation for over-sampling, and then is modulated into the signal light through a SLM (a spatial light modulator) before being stored in the storage medium.

In a reproduction mode of the holographic system, an interference pattern recorded on the storage medium is converted into a page image through the use of an imaging device such as a CCD in a manner that a pixel in the SLM is mapped into 3×3 pixels in the CCD. For example, FIG. 6a illustrates an exemplary page image having a 1024×1024 pixel size reproduced from the storage medium and represented through the CCD. Such page image includes a data image with a size of 720×720 pixels and 3-pixel-sized upper, lower, left and right borders surrounding the data image.

In order to obtain an original data image with a size of N×N pixels, i.e., 240×240 pixels, it is needed to perform an over-sampling process wherein one pixel is extracted and then two pixels are skipped from the data image having a resolution size of 720×720 (i.e., a center pixel is extracted from each of 3×3 masks). FIG. 6b illustrates an exemplary data image having a 240×240 pixel size extracted by way of performing the over-sampling for the page image shown in FIG. 6a.

For this end, it is necessary to detect the borders, thereby to define the data image. One of methods of detecting the borders is to obtain the sum of pixels arranged on each row line in the page image and the sum of pixel values arranged on each column line in the page image, each pixel has a binary value to represent pixel brightness.

FIG. 7 is an exemplary histogram showing the results of obtaining the sums of pixels arranged on each column line in the page image, wherein X-axis denotes column locations of pixels and Y-axis denotes pixel sums. As known from FIG. 7, there are two relatively higher sums (indicated by circles), on Y-axis, that are placed on two opposite sides on X-axis in the histogram. Coordinates on X-axis corresponding to the two relatively higher sums represent locations of left and right borders. The reason that the sum of pixels at the borders is relatively high is because pixels forming the borders have the same binary value of approximately "1", instead that pixels having value of "1" or "0" randomly exist together in the data image. In FIG. 7, the left border corresponds to a 140-th pixel location, and the right border corresponds to a 877-th pixel location. In this case, a region of the left border occupies eight pixels ranging from a 140-th pixel to a 147-th pixel.

After detecting the locations of the borders as described above, each center pixel is extracted for three pixels using the over-sampling process while sequentially moving a mask from an upper left corner to an upper right corner in the data image surrounded by the borders, as shown in FIGS. 8a and 8b.

As described above, if the location of the left border is a 140-th pixel, a theoretical location of the right border should be an 875-th pixel. However, an actual location of the right border is an 877-th pixel as indicated in FIG. 7, which means that there is a magnification of 2 pixels in comparison to the theoretical result.

Thus, in order to compensate distortions of the magnified pixels, the prior art divides an entire data image (i.e., every row and column line) into three equal portions, and performs over-sampling in such a way that three, instead of two, pixels are skipped only at the start positions of the second and third equal portions. For example, the over-sampling process is performed to skip for every two pixels in the data image having 720×720 pixel and to skip three pixels at locations of 389-th pixel and 630-th pixel which correspond to ⅓ division and ⅔ division from the 140-th pixel to the 877-th pixel. As a result, it is possible to achieve compensation of distortions in the data image on a pixel-by-pixel basis.

However, since the locations of the borders are measured on a pixel basis, it is impossible to precisely compensate the distortion on a half-pixel basis, which causes a problem in that a high quality data image cannot be obtained.

SUMMARY OF THE INVENTION

It is, therefore, an object of the present invention to provide an apparatus and method for preprocessing a page image reproduced in a holographic system to compensate a data image having distorted pixels therein.

In accordance with one aspect of the present invention, there is provided an apparatus for preprocessing a page image reproduced from a storage medium in a holographic system, wherein the page image includes a data image and upper, lower, left and right borders surrounding the data image, the apparatus comprising: means for calculating pixel sums for each lines in the page image to select a maximum sum among the calculated sums at upper, lower, left and right corner in the page image, wherein a pixel location corresponding to the maximum sum corresponds to a border location; means for calculating a modified maximum sum using the maximum sum and its neighboring sums, wherein a pixel location corresponding to the modified maximum sum corresponds to a modified location of the border; means for determining a compensation location for distorted pixels using the modified maximum sum; and means for over-sampling pixels in the data image with reference to the compensation location.

In accordance with another aspect of the present invention, there is provided a method of preprocessing a page image reproduced from a storage medium in a holographic system, wherein the page image includes a data image and upper, lower, left and right borders surrounding the data image, the method comprising the steps of: (a) calculating pixel sums for each lines in the page image to select a maximum sum among the calculated sums at upper, lower, left and right corner in the page image, wherein a pixel location corresponding to the maximum sum corresponds to a border location; (b) calculating a modified maximum sum using the maximum sum and its neighboring sums, wherein a pixel location corresponding to the modified maximum sum corresponds to a modified location of the border; (c) calculating a distortion error between the position of the border and the modified location of the border to determine whether the calculated distortion error exceeds a half pixel; (d) determining a compensation location for distorted pixels using the modified maximum sum when it is determined that the calculated distortion error exceeds the half pixel; and (e) over-sampling pixels in the data image with reference to the compensation location.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Preferred embodiments of the present invention will now be described in detail with reference to the accompanying drawings.

Figure 1:
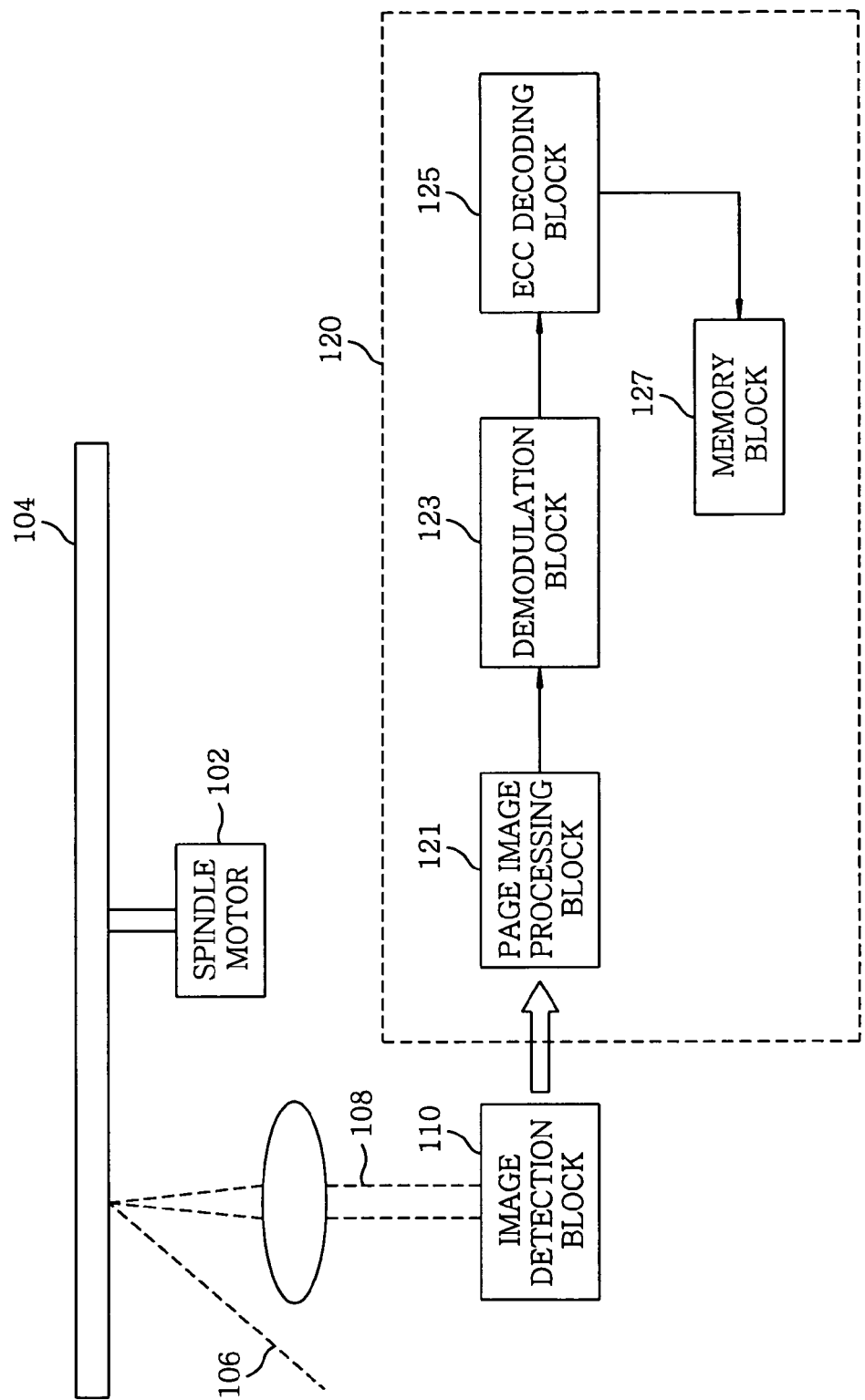
FIG. 1 illustrates a block diagram of a holographic system suitable for applying an over-sampling according to the present invention.
Figure 6A:
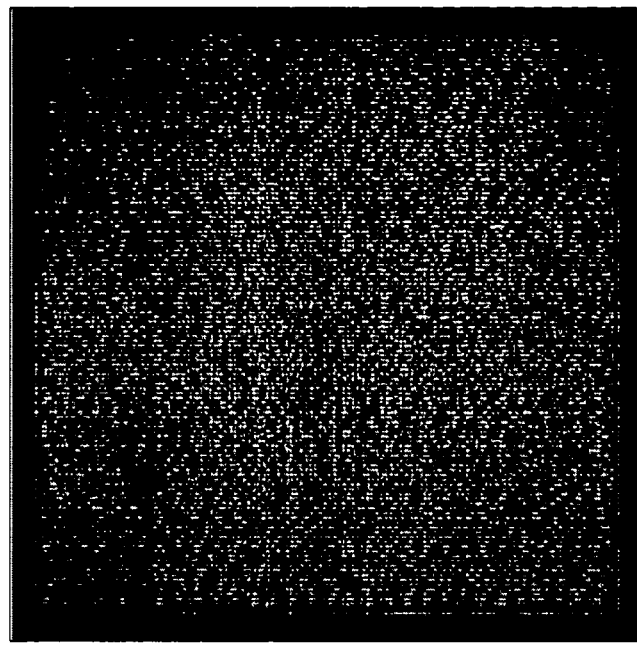
FIG. 6a illustrates an exemplary page image having a 1024×1024 pixel size.
Figure 6B:
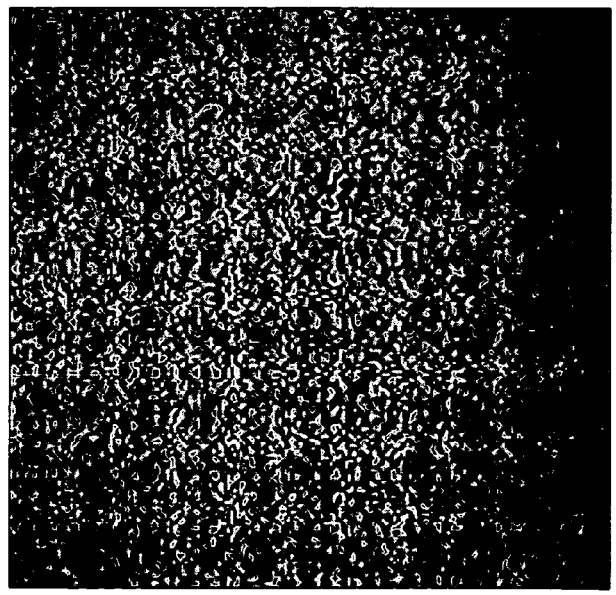
FIG. 6b illustrates an exemplary data image having a 240× 240 pixel size extracted by way of performing the over-sampling.

FIG. 1 illustrates a block diagram of a holographic system for reproducing, which is suitable for applying an over-sampling according to the present invention. The holographic reproduction system includes a spindle motor 102, storage medium 104, an image detection block 110 and a decoding block 120. The spindle motor 102 rotates the storage medium 104. In order to reproduce hologram data from the storage medium 104, read-out light 106 from a light source (not shown) is radiated onto the storage medium 104. Page image light 108 is then reproduced from the storage medium 104 by the radiation of the read-out light 106. The image detection block 110, for example, a CCD module is placed to receive the reproduced page image light 108. The image detection block 110 converts photo-electrically the reproduced page image light 108 into a page image by representing each pixel in the page image in the form of n×n pixel (for example, 3×3 pixel). Consequentially, the page image has a resolution of, e.g., 1024×1024 pixel including a data image and upper, lower, left and right borders 602 surrounding the data image. The page image is then provided to the decoding block 120 as described with reference to FIG. 6a.

The decoding block 120 functions to decode the page image and, as shown in FIG. 1, includes a page image processing block 121, a demodulation block 123, an ECC decoding block 125 and a memory block 127. The page image processing block 121 detects the borders from the page image provided from the image detection block 110 to extract the data image having its original pixel size, e.g., N×N pixel size through an over-sampling procedure. The demodulation block 123 decodes the data image extracted by the page image-processing block 121 to produce an original binary data image before having been recorded on the storage medium 104. For example, the demodulation block 123 decodes the data image using a data conversion method, such as 6:4, 8:6 or 12:8 conversion. The ECC decoding block 125 corrects errors in the data image through error correction decoding using error correction codes inserted in the data image. The data image, the errors of which are corrected by the ECC decoding block 125, is temporarily stored in the memory block 127.

Figure 2:
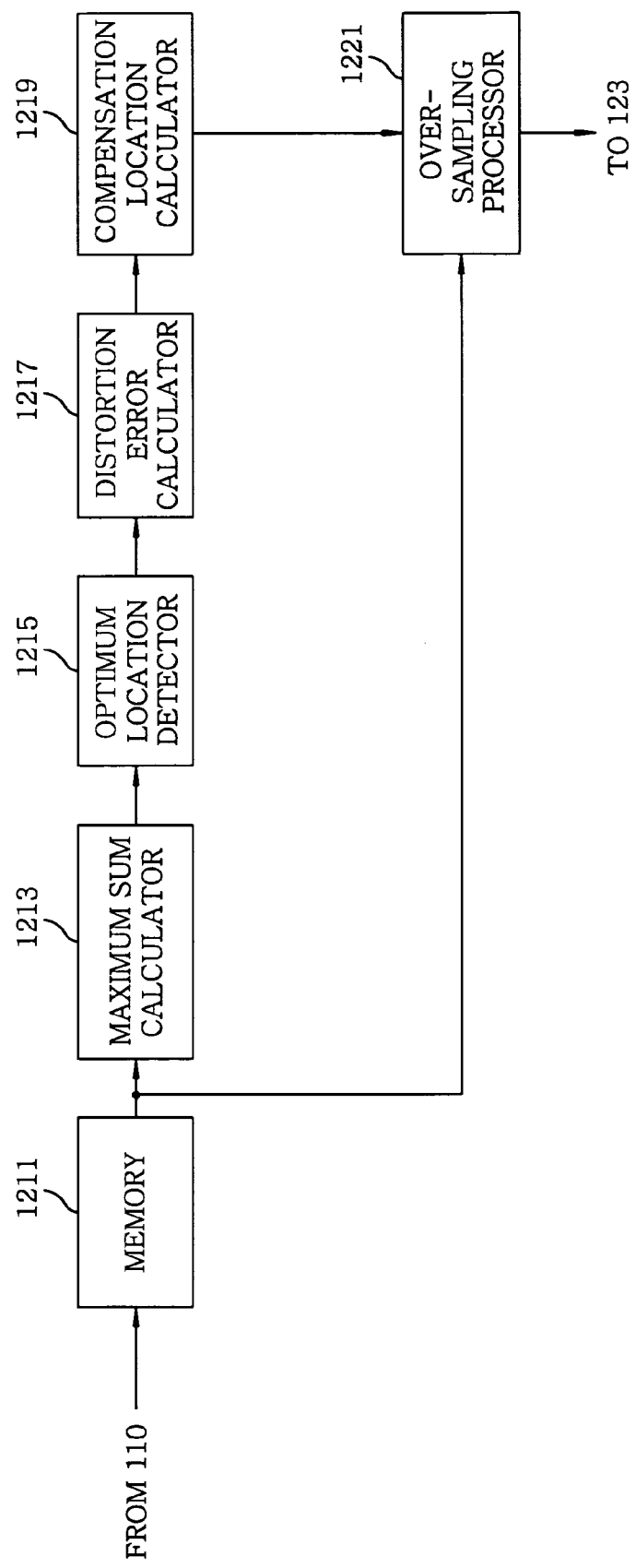
FIG. 2 illustrates a block diagram of an apparatus for pre-processing hologram data reproduced in a holographic reproduction system according to the present invention.

FIG. 2 is a detailed block diagram of the page image-processing block 121 shown in FIG. 1. The page image-processing block 121 includes a memory 1211, a maximum sum calculator 1213, an optimum location detector 1215, a distortion error calculator 1217, a compensation location calculator 1219 and an over-sampling processor 1221.

Figure 7:
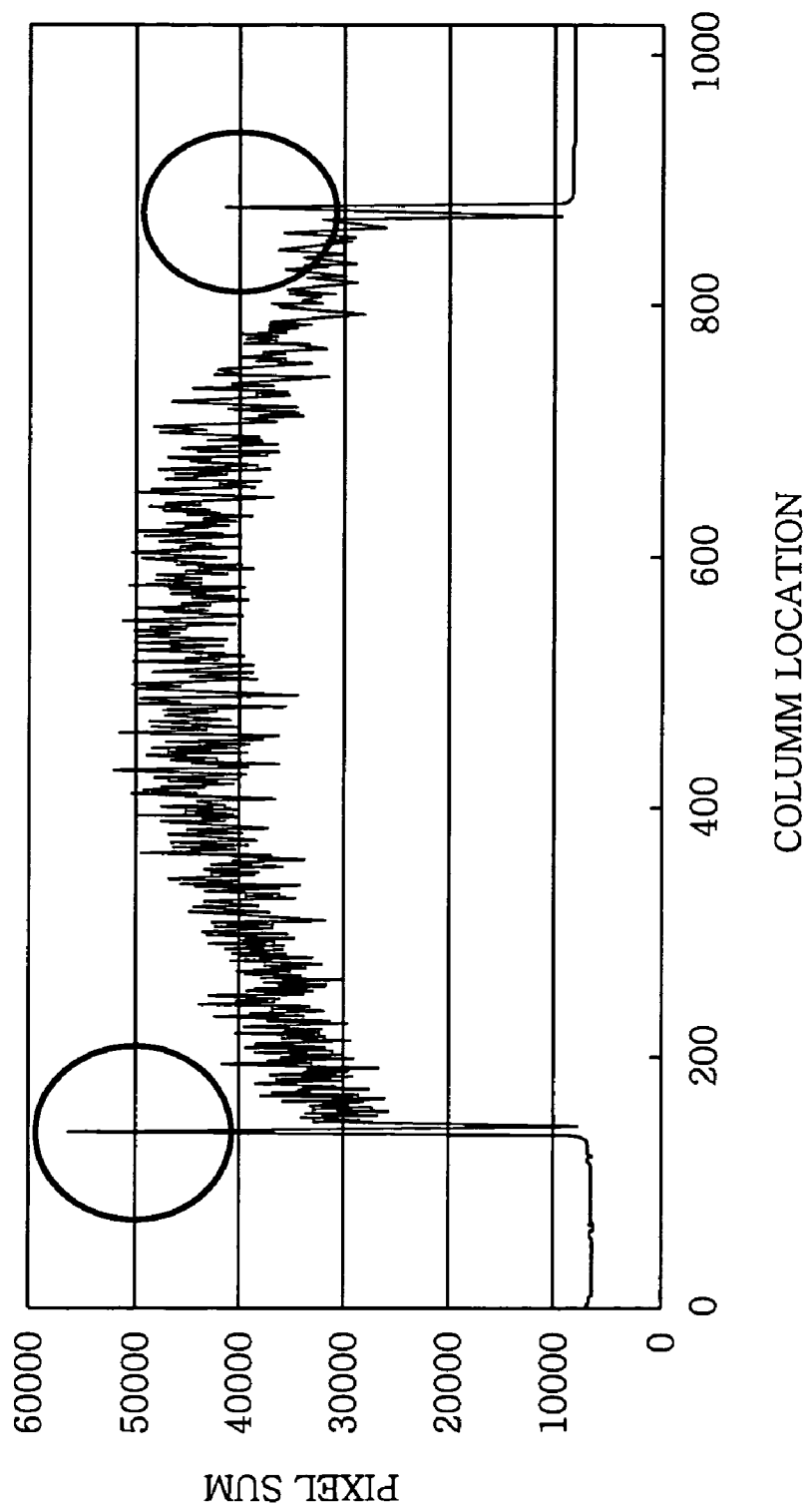
FIG. 7 is an exemplary histogram showing the result of obtaining the sums of pixels arranged on each column line in a page image.
Figure 8A:
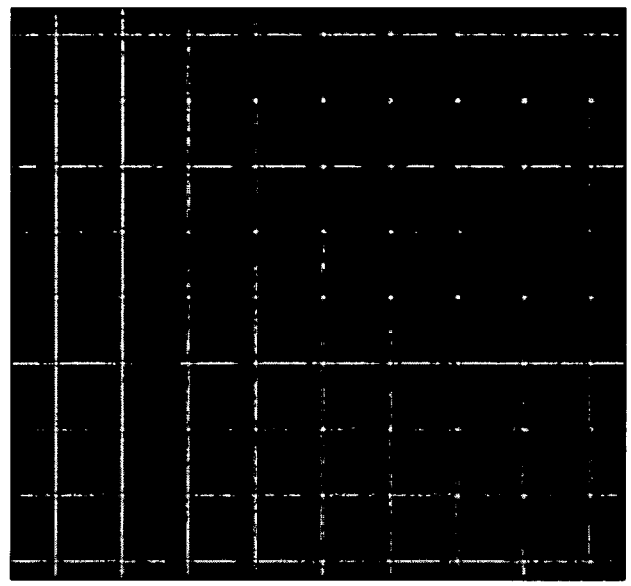
FIGS. 8a and 8b illustrate a process sequentially moving a mask from an upper left corner to an upper right corner in a data image surrounded by borders.
Figure 8B:
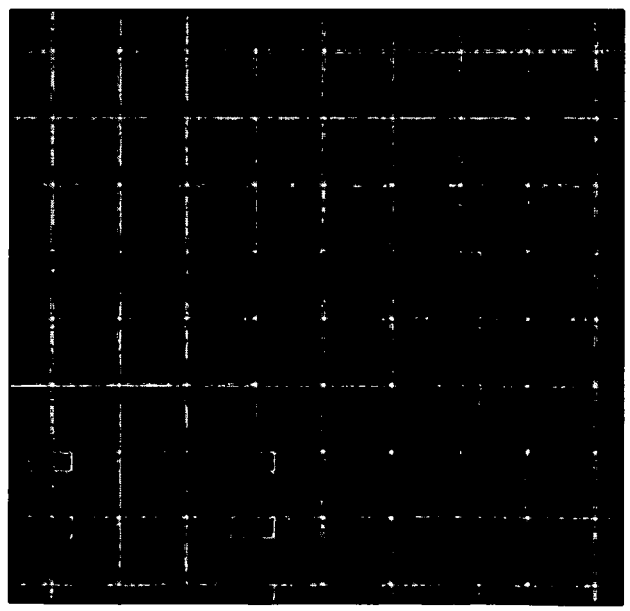

The page image provided from the image detection block 110 shown in FIG. 1 is temporarily stored in the memory 1211. The maximum sum calculator 1213 calculates brightness sums for pixels arranged on each row and column line in the page image to select a maximum sum among the calculated brightness sums at each upper, lower, left and right corner in the page image. A line having the maximum sum at each upper, lower, left and right corner in the page image represents the upper, the lower, the left or the right border in the page image. In FIG. 7, for example, a 140-th pixel becomes a location of a left border, and an 877-th pixel becomes a location of a right border.

Figure 3:
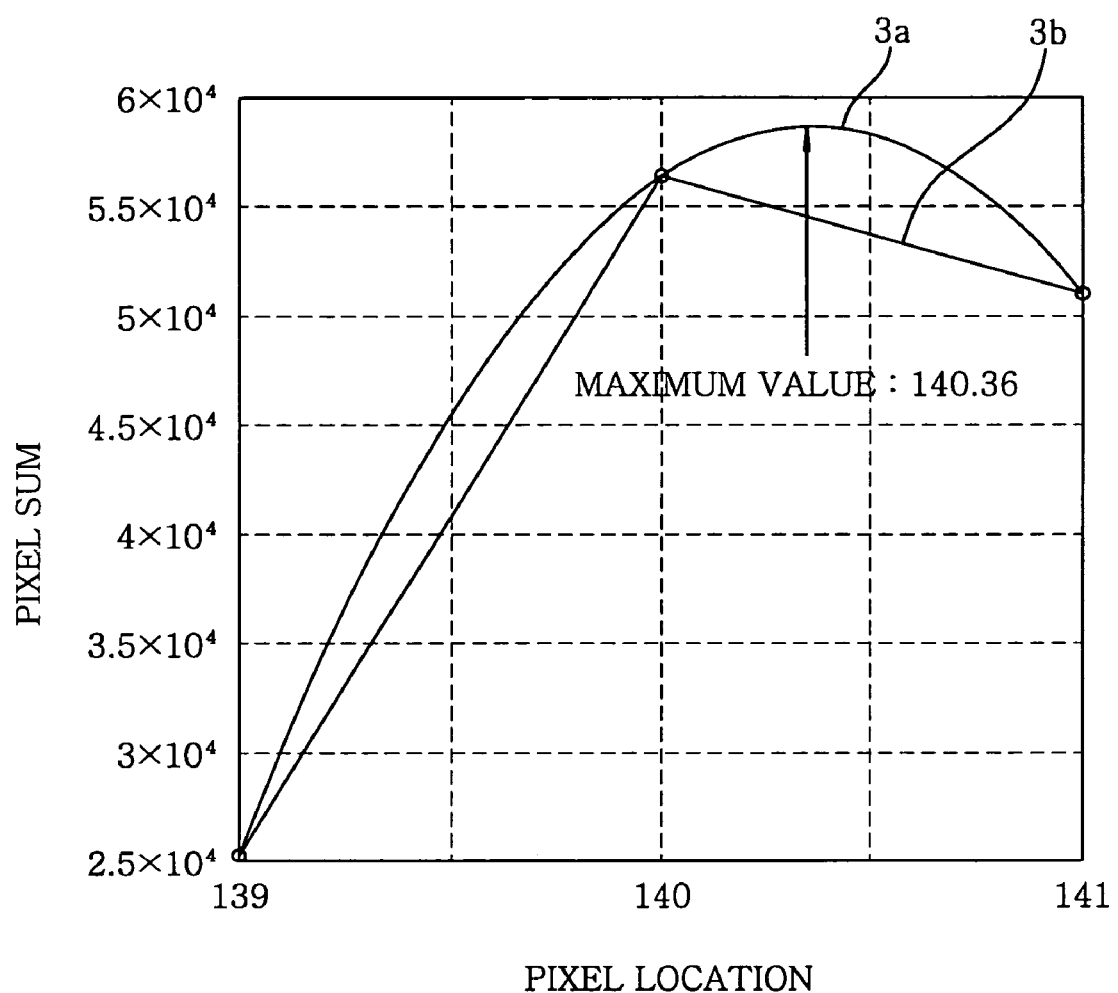
FIG. 3 illustrates a graph showing the result of a curve fitting performed with respect to a left border in accordance with the present invention.

The optimum location detector 1215 performs a curve fitting using the maximum sum and its immediately neighboring sums, to thereby obtain an approximation curve having a shape indicated by a reference numeral 3a. A reference numeral 3b in FIG. 3 denotes a maximum sum obtained by a conventional method. And then the optimum location detector 1215 differentiates values on the approximation curve to obtain a modified maximum sum; wherein a line having the modified maximum sum becomes a modified location of a border. For example, the curve fitting can be modeled as a Least Square Polynomial as follows.

$$Y=M_0+M_1X^1+\ldots+M_{(k-1)}X^{(k-1)}+M_kX^k$$

where k is a positive integer, Y denotes a maximum sum and its neighboring sums, and X denotes lines having the maximum sum and its neighboring sums.

For example, assuming that a 140-th line has a maximum sum and thus becomes a location of a left border, an approximation curve can be obtained through the curve fitting that uses sums for a 140-th line and its immediately neighboring lines, e.g., 139-th and 141-th lines at right and left hands. And then, values on the approximation curve are differentiated to find out a modified maximum sum being a slope of "0" and therefore to obtain a modified location of the left border, which is exemplarily illustrated in FIG. 3 to be a 140.36-th pixel location. That is, the modified location of the left border is not a 140-th pixel, which is an integer, but is actually a 140.36-th pixel, being a real number having a decimal point.

Figure 4:
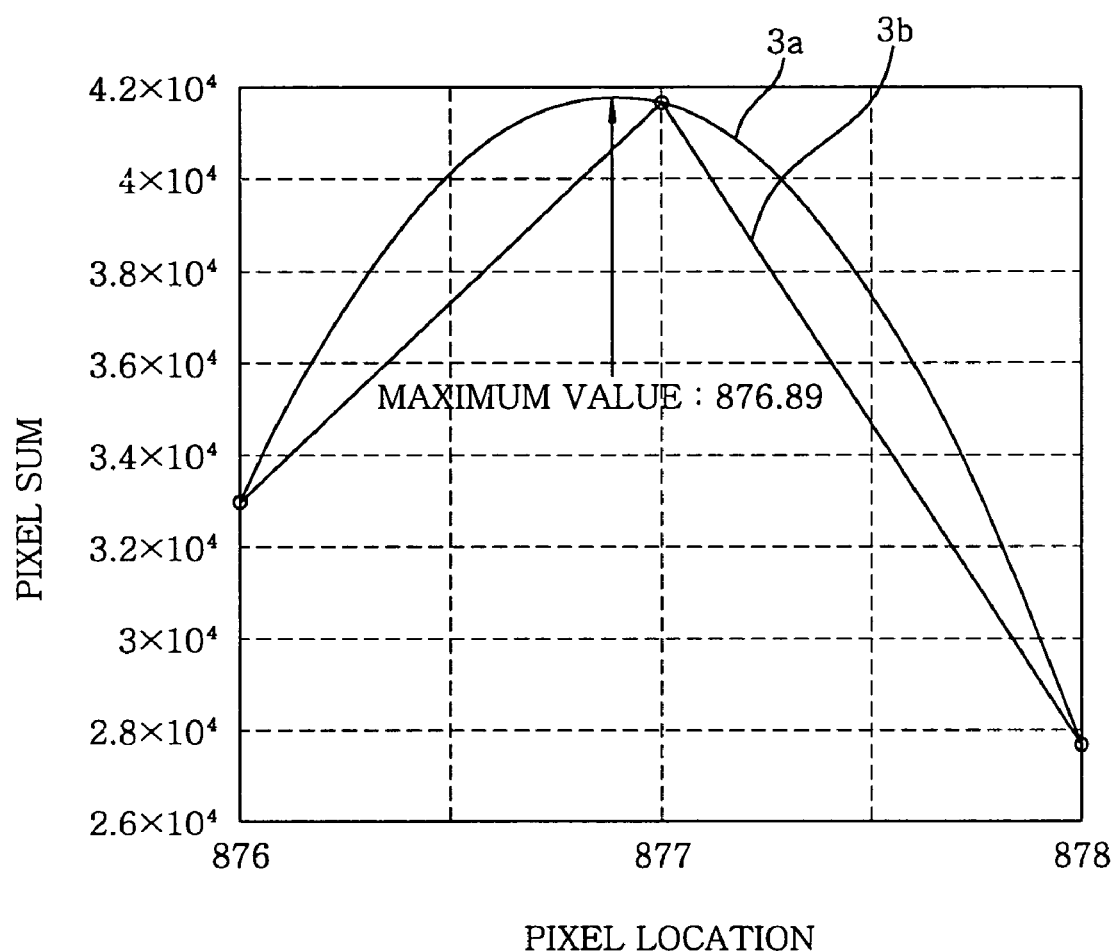
FIG. 4 illustrates a graph showing the result of a curve fitting performed with respect to a right border in accordance with the present invention.

Similarly, the optimum location detector 1215 obtains an approximation curve (indicated by a reference numeral 4a in FIG. 4) by performing the curve fitting based on the maximum sum and its neighboring sums. For example, if the right corner is an 877-th pixel location, an approximation curve 4a can be obtained through the curve fitting that uses a pixel sum for an 876-th line and a pixel sum for 878-th line. A reference numeral 4b in FIG. 4 denotes a maximum sum obtained by a conventional method. The values on the approximation curve are then differentiated and a maximum value having a slope of "0" is calculated, so that a modified location of the right border becomes an 876.89-th pixel. That is, the modified location of the right border is not an 877-th pixel, which is an integer, but is actually an 876.89-th pixel, being a real number having a decimal point.

In this regard, the present embodiment is shown and described that the approximation curve is obtained by employing the curve fitting based on the pixel sums for the left and right lines immediately neighboring to the borderline having a maximum sum. However, it should be understood that the present invention is not limited to this embodiment, but a curve fitting can be performed using the pixel sums for two or more lines neighboring to the border, if necessary.

Next, the distortion error calculator 1217 calculates a distortion error between a theoretical data image and a measured data image to determine whether the distortion error exceeds a half-pixel. For example, in case where a location of a left border is a 140.36-th pixel, a theoretical location of a right border will be an 875.36-th (=140.36+735) pixel. However, an actually detected location of the right border is an 876.89-th pixel. Therefore, a distortion error amounts to a 1.53 pixel. That is, the data image reproduced from the storage medium is magnified by a 1.53 pixel.

The compensation location calculator 1219 determines a compensation location at the sub-pixel level, between the modified locations of a left border and a right border (or an upper border and a lower border). In this case, the compensation locations represent points where skipping three pixels, not two pixels, when performing the over-sampling.

The compensation positions can be calculated by performing a curve fitting as described in Equation 1, therefore, a detailed description thereof will be omitted for the sake of simplicity. In this case, Y will be a modified maximum sum and X will be a line having a modified maximum sum.

Figure 5:
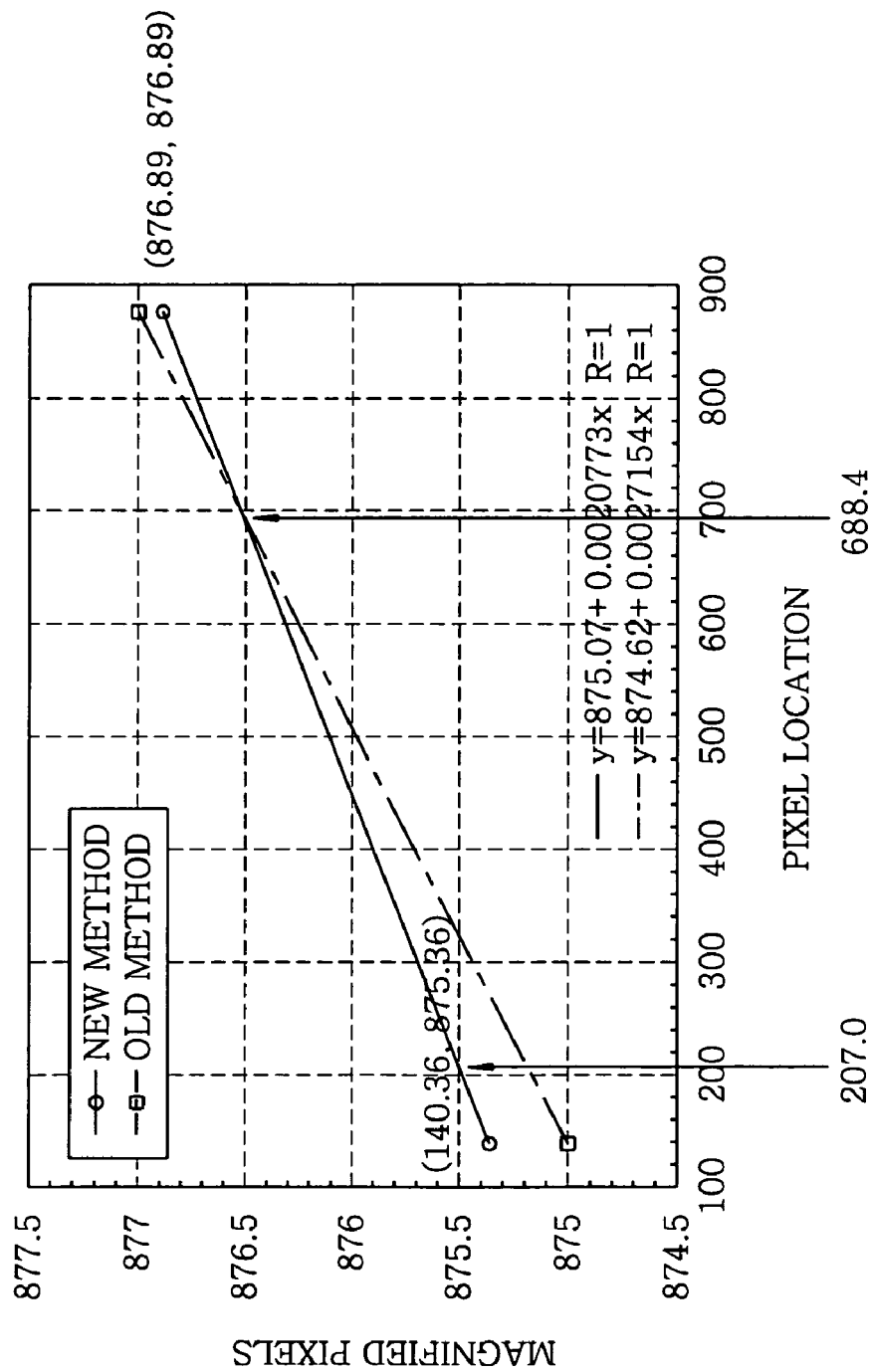
FIG. 5 illustrates a graph showing a process of determining a compensation location of distorted pixels in a data image in accordance with the present invention.

Referring to FIG. 5, there is illustrates a graph showing a process of determining a compensation location of magnified pixels according to the present invention. In FIG. 5, a dashed line indicates a novel method and a doted line indicates a conventional method. For example, it is assumed that a modified location of a left border is a 140.36-th pixel location, a modified location of a right border is an 876.89-th pixel location, a theoretical right corner is an 875.36-th pixel location, and an actually detected location of the right corner is an 876.89-th line. In this case, for example, 270.0-th pixel location and 688.4-th pixel location will be compensation locations with respect to the 875.5-th pixel and the 876.5-th pixel.

Then, the over-sampling processor 1221 performs over-sampling on a basis of the compensation locations provided from the compensation location calculator 1219. For example, a center pixel is extracted using a 3×3 mask, but one of four pixels is extracted at the compensation locations. Therefore, a data image having a 240×240 pixel size is derived from a data image having a 720×720 pixel size. The data image derived in this way is transmitted to the demodulation block 123 of FIG. 1 to process the subsequent decoding operation.

While the invention has been shown and described with respect to the preferred embodiments, it will be understood by those skilled in the art that various changes and modifications may be made without departing from the spirit and scope of the invention as defined in the following claims.

What is claimed is:

1. An apparatus for preprocessing a page image reproduced from a storage medium in a holographic system, wherein the page image includes a data image and upper, lower, left and right borders surrounding the data image, the apparatus comprising:

means for calculating pixel sums for each lines in the page image to select a maximum sum among the calculated sums at each upper, lower, left and right corner in the page image, wherein a pixel location corresponding to the maximum sum corresponds to a border;

means for calculating a modified maximum sum using the maximum sum and its neighboring sums, wherein a pixel location corresponding to the modified maximum sum corresponds to a modified location of the border;

means for calculating a distortion error between the position of the border and the modified location of the border to determine whether the calculated distortion error exceeds a half pixel;

means for determining a compensation location for distorted pixels using the modified maximum sum when it is determined that the calculated distortion error exceeds the half pixel; and means for over-sampling pixels in the data image with reference to the compensation location.

2. The apparatus of claim 1, wherein the means for calculating a modified maximum sum performs a curve fitting to find out the modified maximum sum, wherein curve fitting is expressed as the Least Square Polynomial as follows:

$$Y=M_0+M_1X^1+\ldots+M_{(k-1)}X^{(k-1)}+M_kX^k$$

where k is a positive integer, Y denotes a maximum sum and its neighboring sums, and X denotes lines having the maximum sum and its neighboring sums.

3. The apparatus of claim 2, wherein means for determining a compensation location performs a curve fitting to find out the compensation location, wherein the curve fitting is expressed as the Least Square Polynomial as follows:

$$Y=M_0+M_1X^1+\ldots+M_{(k-1)}X^{(k-1)}+M_kX^k$$

where k is a positive integer, Y denotes a modified maximum sum and X denotes a line having the modified maximum sum.

4. The apparatus of claim 1, wherein the neighboring sums include the sums arranged at left and right hands of the maximum sum.

5. The apparatus of claim 1, wherein the compensation location represents a point where skipping three pixels at the time of over-sampling.

6. A method of preprocessing a page image reproduced from a storage medium in a holographic system, wherein the page image includes a data image and upper, lower, left and right borders surrounding the data image, the method comprising:
  (a) the holographic system performing the steps of:
  (b) calculating pixel sums for each lines in the page image to select a maximum sum among the calculated sums at upper, lower, left and right corner in the page image, wherein a pixel location corresponding to the maximum sum corresponds to a border location;
  (c) calculating a modified maximum sum using the maximum sum and its neighboring sums, wherein a pixel location corresponding to the modified maximum sum corresponds to a modified location of the border;
  (d) calculating a distortion error between the position of the border and the modified location of the border to determine whether the calculated distortion error exceeds a half pixel;
  (e) determining a compensation location for distorted pixels using the modified maximum sum when it is determined that the calculated distortion error exceeds the half pixel; and
  (f) over-sampling pixels in the data image with reference to the compensation location.

7. The method of claim 6, wherein the step of calculating a modified maximum sum performs a curve fitting to find out the modified maximum sum, wherein curve fitting is expressed as the Least Square Polynomial as follows:

$$Y = M_0 + M_1 X^1 + \ldots + M_{(k-1)} X^{(k-1)} + M_k X^k$$

where k is a positive integer, Y denotes a maximum sum and its neighboring sums, and X denotes lines having the maximum sum and its neighboring sums.

8. The method of claim 7, wherein the step of determining a compensation location performs a curve fitting to find out the compensation location, wherein the curve fitting is expressed as the Least Square Polynomial as follows:

$$Y = M_0 + M_1 X^1 + \ldots + M_{(k-1)} X^{(k-1)} + M_k X^k$$

where k is a positive integer, Y denotes a modified maximum sum and X denotes a line having the modified maximum sum.

9. The method of claim 6, wherein the neighboring sums include the sums arranged at left and right hands of the maximum sum.

10. The method of claim 6, wherein the compensation location represents a point where skipping three pixels at the time of over-sampling.

* * * * *